United States Patent

Severtson et al.

[11] Patent Number: 6,113,738
[45] Date of Patent: Sep. 5, 2000

[54] USE OF ADDITIVES TO BREAKDOWN AND STABILIZE WAX DURING FIBER RECYCLE

[75] Inventors: Steven J. Severtson, Lisle; Martin J. Coffey, Naperville, both of Ill.

[73] Assignee: Nalco Chemical Company, Naperville, Ill.

[21] Appl. No.: 09/039,863

[22] Filed: Mar. 16, 1998

[51] Int. Cl.⁷ .................................................. D21C 5/02
[52] U.S. Cl. ........................................... 162/5; 162/8
[58] Field of Search .................................. 162/4, 5, 6, 8

[56] References Cited

U.S. PATENT DOCUMENTS

| | | |
|---|---|---|
| 1,628,931 | 5/1927 | Todd . |
| 3,262,838 | 7/1966 | Vieth et al. ................................. 162/8 |
| 3,287,149 | 11/1966 | Dooley et al. ............................ 117/15 |
| 3,537,990 | 11/1970 | Eck et al. ................................. 210/732 |
| 3,822,178 | 7/1974 | Koeppen et al. ........................... 162/5 |
| 3,940,334 | 2/1976 | Miyazawa ................................ 210/732 |
| 4,045,243 | 8/1977 | Wohlert ...................................... 134/1 |
| 4,117,199 | 9/1978 | Gotoh et al. ............................. 428/486 |
| 4,312,701 | 1/1982 | Campbell .................................... 162/4 |
| 4,483,741 | 11/1984 | Maloney et al. ............................ 162/5 |
| 4,518,459 | 5/1985 | Freis et al. .................................. 162/5 |
| 4,629,477 | 12/1986 | Geke .......................................... 55/85 |
| 4,643,800 | 2/1987 | Maloney et al. ............................ 162/5 |
| 4,923,566 | 5/1990 | Shawki et al. ........................... 162/136 |
| 5,209,823 | 5/1993 | Jansma et al. ........................... 162/146 |
| 5,324,437 | 6/1994 | Geke et al. .............................. 210/274 |
| 5,342,483 | 8/1994 | Hwang ........................................ 162/5 |
| 5,403,392 | 4/1995 | Craig ........................................ 106/162 |
| 5,415,739 | 5/1995 | Furman, Jr. et al. .................... 162/158 |
| 5,491,190 | 2/1996 | Sandvick et al. ......................... 162/58 |
| 5,500,082 | 3/1996 | Chang et al. ............................... 162/5 |
| 5,539,035 | 7/1996 | Fuller et al. ............................. 524/322 |
| 5,541,246 | 7/1996 | Dandreaux et al. ..................... 524/272 |
| 5,601,844 | 2/1997 | Kagayama et al. ...................... 424/489 |
| 5,654,039 | 8/1997 | Wenzel et al. ........................... 427/391 |
| 5,658,971 | 8/1997 | Allin et al. ................................ 524/28 |

FOREIGN PATENT DOCUMENTS

| | | |
|---|---|---|
| 0 568 229 A1 | 4/1992 | European Pat. Off. . |
| WO 91/05107 | 4/1991 | WIPO . |

OTHER PUBLICATIONS

Tappi Proceedings, 1986 Pulping Conference; Stickies Control by Detackification pp. 193–196.

*Primary Examiner*—Dean T. Nguyen
*Attorney, Agent, or Firm*—Margaret M. Brumm; Thomas M. Breininger

[57] ABSTRACT

Methods for controlling wax and other contaminants by improving the dispersion of these materials through the addition of treatment agents such as plasticizers, dispersants or wetting agents to the process of recycling paper and paperboard are disclosed. Preferred treatment agents include polymeric wetting agents, dispersants, plasticizers and combinations thereof.

4 Claims, No Drawings

USE OF ADDITIVES TO BREAKDOWN AND STABILIZE WAX DURING FIBER RECYCLE

FIELD OF THE INVENTION

Methods for controlling wax and other contaminants by improving the dispersion of these materials through the addition of treatment agents such as plasticizers, dispersants or wetting agents to the process of recycling paper and paperboard are disclosed. Preferred treatment agents include polymeric wetting agents, dispersants, plasticizers and combinations thereof.

BACKGROUND OF THE INVENTION

Old corrugated containers (OCC) make up a high percentage of the recycled paper used in the United States, a majority of which is made into new container board. With such a high reuse level, old corrugated containers are an extremely important raw material for the container board industry. A significant unused source of OCC are wax treated containers. These are corrugated containers which are coated or impregnated with wax and used to ship fruit, produce and other agricultural products, as well as nonagricultural products such as bulk nail, screw, and bearing boxes. With waxed corrugated representing about 1.3 million tons or about 5% of the shipped corrugated in 1995, it represents an attractive fiber source. What makes this source even more attractive is the fact that waxed corrugated is typically produced from virgin fiber and its use is concentrated in a handful of industries; thus it is a high quality fiber source that would be relatively inexpensive to collect. Currently, waxed corrugated is not accepted for recycling. It is considered too contaminated and is sorted out for landfilling or sold for its b.t.u. value. The problem is that waxed corrugated causes a serious contamination issue for a mill. The released wax tends to collect on equipment and in the finished paper products causing problems with mill operations and affecting product quality. To reasonably increase the level of waxed OCC used by the paper industry to the point where mills will accept and possibly seek out waxed containers, great strides in new technology for controlling wax in the recycle plant will have to be introduced.

Wax is a generic term widely applied to a diverse group of natural and synthetic products which have similar physical characteristics; they are plastic solids at ambient temperatures, and low viscosity fluids at moderately elevated temperatures. The chemical composition of waxes can be complex, containing a variety of molecular weight species and functional groups, or relatively simple, as in the case of some petroleum and synthetic waxes which are composed solely of hydrocarbons. Natural waxes are derived from various sources such as insects, animals, vegetables, minerals, and petroleum. Examples of synthetic waxes include low molecular weight polyethylene (mol. wt.<600), solid polyethylene glycols, amide waxes, and Fisher-Tropsch waxes (low molecular weight polymethylene).

Depending on the specific application, waxed corrugated containers will be coated with blends of paraffin and micro waxes as well as blends that include synthetic waxes, polymers, and resins. Synthetic waxes such as polyethylene and Fischer-Tropsch are similar to paraffin wax in that they are composed of unbranched alkanes, but because they're polymeric materials they tend to have much higher molecular weights. For example, polyethylene waxes are composed of low molecular weight polyethylenes, and Fisher-Tropsch are low molecular weight polymethylenes. Melting points for these materials tend to be significantly greater than those for petroleum waxes (>200° F. for polyethylene and up to 220° F. for Fisher-Tropsch polymers), thus their addition to a wax will produce higher melting points and often increased coating hardness. The most common polymer additive to be incorporated into wax coatings is ethylene-vinyl acetate (EVA). EVA is a random copolymer of ethylene (50–95%) and vinylacetate (5–50%). EVAs with softening points of up to 400° F. are often used.

Wax-blend coatings may also include tackifying resins which are incorporated to increase the affinity of the wax coating for a substrate. In addition to the adhesional effects, the added resins can also lower a coating's softening and melting points. Tackifying resins include hydrocarbons, rosins and rosin derivatives, and polyterpenes. Hydrocarbon resins can be aliphatic or aromatic hydrocarbons. Aliphatic rosins include low molecular weight polymers and alkenes with 5-carbon backbones. Aromatic hydrocarbon resins are 9-carbon derivatives of polystyrene. Rosins are free acids and acids containing double bonds. They're naturally occurring resins which are found in pine trees. Derivatives are produced by polymerizing, hydrogenating, or estifying rosin. Polyterpenes are derived from alpha- or beta-pinene.

In the recycle plant, mill operators have defined three categories for the wax that is removed from the OCC at the repulper: free wax which is removed from boxes as large discrete particles, suspended wax which exist as small dispersed particles (in the 40 micrometer range), and adsorbed wax which coats the fibers. The distribution amongst these categories will depend on the repulping temperatures, the melting point of the coatings, and the temperature of the pulp slurry as it moves through the recycle plant. A typical recycle mill will repulp OCC at temperatures of around 115–140° F. For some coated containers, this may be hot enough to melt or suspend the wax and completely defiber the waxed corrugated containers. The low viscosity of the suspended wax allows for the formation of small, discrete particles which move freely with the pulp slurry. These particles are removed at high efficiencies during the washing or dewatering of the pulp, but as the temperature drops, they can again solidify and adhere to fibers (adsorbed wax) and mill equipment. At the typical wax-based (contamination) level in OCC, this only periodically affects operations. However, when levels of treated containers increase (e.g., when grocery store bails which typically contain a high wax-coated container concentration enter the system), the higher levels of wax results in more frequent shutdowns (breaks and clean-ups) and lower quality product.

In addition to appearance problems from wax spotting in final products, the wax associated with the fiber can interfere with the performance of additives such as sizing agents and retention aids. It can also affect the handling, conversion, and performance of the final product. The wax lowers the paper-to-paper friction coefficient. In the industry, this is typically quantified as the tangent of the angle at which two paper surfaces will begin to slide free from each other, known as the angle of slip (AOS), or slide angle. There is strong evidence that wax is the primary cause of reduced AOS in board utilizing OCC. This reduced friction coefficient can create problems during conversion. For example, the slippery surfaces of the linerboard can cause the corners of the linerboard to get out of alignment and possibly tumble over, thus reducing the stack height of linerboard and slowing the converting operations. Wax adsorbed interferes with fiber-fiber bonding, which reduces product strength characteristics. Moreover, there is strong evidence that Scott bond and compression strength are reduced considerably by the presence of wax.

There are three major types of wax treated boxes found in bundles of OCC: impregnated, saturated, and curtain-coated. They all can produce contamination problems because all three types can contain wax that will soften or melt at repulping temperatures, hindering removal and promoting deposition on equipment. Approaches for dealing with wax contamination have been threefold. The problem may be addressed upon repulping with improved mechanical processes to aid separation, upon application of the initial coating of the paper to eventually be repulped by coating additives; or upon improved repulping with repulping additives. This invention focuses on improvements of the latter type.

Mechanical improvements to the recycling process to increase efficiency (the first type of solution to the problem) include the use of ultrasound in U.S. Pat. No. 4,045,243 and a high pressure stream of steam in U.S. Pat. No. 4,312,701.

Development of more readily repulpable coatings (the second type of solution to the problem) that can be easily separated from fiber and removed with conventional cleaning systems (i.e., screens and cleaners) is ongoing. For example, dispersant coating additives are generally described in WO 91/05107. Many polymeric additives to coatings have also been identified. Copolymers of acrylamide/acrylic esters have been disclosed in U.S. Pat. No. 3,262,838; the copolymerization product of styrene and the half ester formed by the half esterification of 1 mole of an alpha-beta unsaturated dicarboxylic acid has been disclosed in U.S. Pat. No. 3,287,149; butadiene-methyl methacrylate copolymer latex is disclosed in U.S. Pat. No. 4,117,199; a wax composition is disclosed in U.S. Pat. No. 5,539,035 and a variety of other polymeric coating additives are disclosed in U.S. Pat. Nos. 5,491,190; 5,658,971 and 5,654,039.

To aid the repulping process, efforts have also been focused on the development of more readily repulpable hot melt adhesives, as disclosed in U.S. Pat. No. 5,541,246 for example.

Examples of the third type of solution, the development of repulping process additives include EP 0,568,229 A1 which discloses a hydrophobically modified associative polymer including hydrophobically substituted polyethylene oxide polymers; U.S. Pat. No. 4,643,800 which discloses use of a substituted oxyethylene glycol non-ionic surfactant and a water-soluble, low molecular weight polyelectrolyte dispersant; alkylamine polyethers for foam control disclosed in U.S. Pat. No. 4,483,741 and U.S. Pat. No. 1,628,931 which discloses use of trisodium phosphate. Moreover, additives to the repulping process for the removal of ink include long-chain alcohols as disclosed in U.S. Pat. No. 5,500,082 and surface-active poly(ethers) in U.S. Pat. No. 4,518,459.

Dispersion of waxes is a problem in many industrial processes, aside from the repulping process in the pulp and paper industry. Dissipation of waxy dispersions with cationic, anionic or non-ionic emulsifying agents have been disclosed in U.S. Pat. No. 3,537,990. Wax coagulation has been effected by cyanamide derivatives as disclosed in U.S. Pat. No. 4,629,477; by water-soluble non-ionic emulsifiers in U.S. Pat. No. 3,822,178; by a plant glycoside dispersion stabilizer in U.S. Pat. No. 5,403,392; by means of molybdenum-containing coagulants in U.S. Pat. No. 5,324,437 and by a mechanical technique in U.S. Pat. No. 3,940,334.

SUMMARY OF THE INVENTION

Methods for controlling wax and other contaminants by improving the dispersion of these materials through the addition of treatment agents such as plasticizers, dispersants or wetting agents to the process of recycling paper and paperboard are disclosed. Preferred treatment agents include polymeric wetting agents, dispersants, plasticizers and combinations thereof.

DESCRIPTION OF THE INVENTION

One aspect of this invention is a method of treating contaminants in a contaminated fiber slurry during recycling comprising the steps of:
 a) adding to a contaminated fiber slurry at least one plasticizer;
 b) dispersing contaminants from said contaminated fiber slurry to obtain a treated fiber in a contaminant-containing slurry;
 c) separating said treated fiber from said contaminant-containing slurry; and,
 d) recovering said treated fiber.

Another aspect of this invention is a method of treating contaminants from a contaminated fiber slurry during recycling comprising the steps of:
 a) adding to a contaminated fiber slurry a composition comprising
  i) at least one hydrophobic surface active polymeric wetting agent;
  ii) at least one dispersant;
  iii) at least one plasticizer;
 b) dispersing contaminants from said contaminated fiber slurry to obtain a treated fiber in a contaminant-containing slurry;
 c) separating said treated fiber from said contaminant-containing slurry; and,
 d) recovering said treated fiber.

Yet another aspect of this invention is a method of treating contaminants from a contaminated fiber slurry during a recycling process comprising the steps of:
 a) adding to a contaminated fiber slurry under agitation at least one plasticizer;
 b) dispersing contaminants from said contaminated fiber slurry to obtain a treated fiber in a contaminant-containing slurry;
 c) separating said treated fiber from said contaminant-containing slurry; and,
 d) recovering said treated fiber.

Still another aspect of this invention is a method of treating contaminants from a contaminated fiber slurry during a recycling process comprising the steps of:
 a) adding to a contaminated fiber slurry under agitation a composition comprising
  i) at least one hydrophobic surface active polymeric wetting agent;
  ii) at least one dispersant;
  iii) at least one plasticizer;
 b) dispersing contaminants from said contaminated fiber slurry to obtain a treated fiber in a contaminant-containing slurry;
 c) separating said treated fiber from said contaminant-containing slurry; and,
 d) recovering said treated fiber.

A further aspect of this invention is a method of treating contaminants from a contaminated fiber slurry in an aqueous repulping medium during repulping of old corrugated containers comprising the steps of:
 a) adding to a contaminated fiber slurry at least one plasticizer;

b) dispersing contaminants from said contaminated fiber slurry to obtain a treated fiber in a contaminant-containing repulping medium;

c) separating said treated fiber from said contaminant-containing repulping medium; and, d) recovering said treated fiber.

Another aspect of this invention is a method of treating contaminants from a contaminated fiber slurry in an aqueous repulping medium during repulping of old corrugated containers comprising the steps of:

a) adding to a contaminated fiber slurry a composition comprising
  i) at least one hydrophobic surface active polymeric wetting agent;
  ii) at least one dispersant;
  iii) at least one plasticizer;

b) dispersing contaminants from said contaminated fiber slurry to obtain a treated fiber in a contaminant-containing repulping medium;

c) separating said treated fiber from said contaminant-containing repulping medium; and, d) recovering said treated fiber.

The following information may be applicable to any aspect of this invention. The method may further comprise the subsequent addition of a compound selected from the group consisting of coagulants, bentonite and colloidal silica. The hydrophobic surface active polymeric wetting agent may have an HLB value of from about 1 to about 8. More particularly, the hydrophobic surface active polymeric wetting agent may be an ethylene oxide/propylene oxide block copolymer. The dispersant may be selected from the group consisting of: naphthalene sulfonic acid-formaldehyde condensates and lignin sulfonates. Moreover, the dispersant may be a naphthalene sulfonic acid-formaldehyde condensate. The plasticizer may be selected from the group consisting of esters and ethers. More particularly, the plasticizer may be 2,2,4-trimethyl-1,3-pentanediol isobutyrate. The contaminant may be wax. One preferred treatment composition is an ethylene oxide/propylene oxide block copolymer, a naphthalene sulfonic acid-formaldehyde condensate and 2,2,4-trimethyl-1,3-pentanediol isobutyrate. The composition may be added at a point in said process selected from the group consisting of: the repulper, the refiner and the pump.

The additives described herein may also have utility in petroleum or mineral processing. Moreover, the additives could potentially have utility as pitch control agents, stickies and tackies removal agents, or even as sizing agents in the manufacture of paper.

The Contaminants

The contaminants to be removed may be either synthetic or natural. Among natural contaminants are fatty acids, rosin acids, fatty esters and petroleum waxes. Among synthetic contaminants are stickies, ink and coating binders. Stickies include contact adhesives, hot melts and synthetic waxes.

The Plasticizers

A plasticizer is anything which reduces the temperature at which a substance can be broken down. Several types of plasticizers are applicable for the practice of this invention. One type of plasticizers are adipates including adipic acid, dimethyl adipate, diethyl adipate, di-n-butyl adipate, diisobutyl adipate, di-n-hexyl adipate, di (1,3-dimethylbutyl) adipate, di-2-ethylhexyl adipate, diisooctyl adipate, dicapryl adipate, heptyl nonyl adipate, diisononyl adipate, di-n-octyl-n-decyl adipate, diisodecyl adipate, dicyclohexyl adipate, benzyl octyl adipate, dibutoxyethyl adipate, bis (2,2,4-trimethyl-1,3-pentanediol monoisobutyl) adipate, bis(4-chlorobutyl) adipate and diisohexyl adipate among others. Other types include amide-esters, azelates, benzoates, benzotriazoles, brassylates, carbonates, citrates, epoxy compounds, ethers, glutarates, glycerol esters, glycol esters, glycols, glycolates, hexahydrophthalates, hydrocarbons, isobutyrates, isophthalates, isosebacates, ketones, nitro compounds, oleates, palmitates, pentaerythritol esters, phosphates, phosphites, phthalates, polyesters and polymeric plasticizers, pyromellitates, ricinoleates, salicylates, sebacates, stearates, succinates, sucrose derivatives, sulfonamides, sulfonates, sulfones, tartrates, terephthalates, tetrahydrophthalates, thianthrenes, trimellitates, and terpenes and derivatives among others.

The Wetting Agents

For the practice of this invention, the wetting agent may be a block copolymer of ethylene oxide and propylene oxide. EO/PO copolymers of interest may have a molecular weight of from about 2000 to about 5000 and an EO content of from about 0 to about 30%. Preferred HLB values are from about 1 to about 8. Higher molecular weight structures with a low EO content are known as excellent wetting agents. The term "wetting agent" is meant to encompass agents which wet particle surfaces without raising energy barriers of sufficient height to disperse the particle. Examples may include block terpolymers which include butylene oxide/ethylene oxide/propylene oxide. Other examples of wetting agents which may be useful for the practice of this invention include polyoxyethyleneated alkylphenols, polyoxyethyleneated straight-chain alcohols, polyoxyethylenated polyoxypropylene glycols, polyoxyethylenated mercaptans, long-chain carboxylic acid esters, alkanolamides, tertiary acetylenic glycols, and polyoxyethylenated silicones among others.

The Dispersants

As used herein, the term dispersion refers to a process which breaks down a contaminant and prevents that contaminant's agglomeration and deposition to the point where problems associated with runnability and product quality are significantly reduced. A dispersant is an agent which produces energy barriers of sufficient height for dispersion of a particle. Dispersants may be ionic or non-ionic.

A representative ionic dispersant is a naphthalene sulfonate formaldehyde condensed polymer. Such a polymer is available from Hampshire Chemical Corp. of Lexington, Mass. The naphthalene sulfonate formaldehyde condensed polymer has a weight average molecular weight of from about 500 to about 120,000. Due to the chemistry involved in the formaldehyde condensation process, the typical polymer preparation will consist of a number of molecular weight species and the weight average will reflect in which direction the distribution of species is skewed. In no case will there be a single molecular weight entity and it is recognized that the distribution and resulting average molecular weight will be important in determining the efficiency of the product. In terms of intrinsic viscosity, IV, the anionic polymer is generally within the range of 0.02 to 0.05, and in some instances may be as high as 0.30.

The anionic groups are provided by naphthalene sulfonate moieties and control the anionic charge density of the polymer. This charge density can be modified by adding another condensable species, such as phenol, urea or melamine which will compolymerize with the naphthalene sulfonate and formaldehyde. In this way the charge per unit weight can be decreased by adding a neutral or cationic species to the cross-linked, anionic sulfonate.

The charge on the anionic polymer is preferably 2.0 to 3.0 equivalents per kilogram but may be as low as 1.0 or as high as 4.0 equivalents per kilogram.

The Treatment

The treatments described herein will be applied at dosages tailored to the specific mill stream to be treated. A significant factor in determining how much of the treatment to utilize is the amount of wax known to be present in the process stream to be treated. For example, if there is from 0–25% wax in the slurry or stream to be treated, then the treatment will range from 0–200 lb/ton. More particularly, if from 0–5% wax contamination is present, from 0–40 lb/ton of treatment may be utilized. If from 0–2% of wax is present in the system, the treatment level may be in the range of from 0–15 lb/ton. For multi-component treatments, such as those containing a wetting agent, a dispersant and a plasticizer, equal mass blends were utilized, though it is not believed that this particular ratio of the components is critical to activity.

Mode of addition of the treatments to the system is not critical. The components (if the treatment is a multi-component one) can be pre-blended for addition at one point in the system, or addition at multiple points in the system. Moreover, each component may be fed separately to the system.

The treatment of contaminants to decrease their interference in the recycling process may be accomplished in either of two ways by the treatments described herein. The contaminant may be sufficiently dispersed as to become completely dissociated from the fiber, or the contaminants may be retained with the fiber but in reduced size as a result of treatment.

Selection of the appropriate additive, or combination of additives is dependant upon the type of wax contamination, the level of wax contamination and the temperature of the particular system to be treated.

Mixing is advantageous to the dispersant treatment. Shear force is provided by the pulp and paper process itself for example from the refiners, repulpers, agitators, and fan pumps. Therefore agitation may be either the result of a specific mechanical step during the process, or may stem from the flow conditions inherent in the process.

Coagulants may be used as an adjunct to the treatments described above to destabilize the wax dispersed by the treatments described above, for greater ease of removal. Coagulants useful for the practice of this invention include alum, polyaluminum chloride, or cationic polymers such as poly(amine/epichlorohydrin) condensation polymers, polyethylene imines, poly(aminoamide/epichlorohydrin) condensation polymers, poly(diallyldimethylammonium chloride), and glyoxalated acrylamide/diallyldimethyl ammonium chloride copolymers among others. In addition to coagulants other destabilizing agents such as salts or acids may also be adjuncts to the additives described herein.

The following examples are presented to describe preferred embodiments and utilities of the invention and are not meant to limit the invention unless otherwise stated in the claims appended hereto.

EXAMPLE 1

To determine the effectiveness of the treatments, the following procedure was utilized. Three grams of bleached kraft dry lap fiber, 250 mL of hardened distilled water (275.4 ppm $CaCl_2.2H_2O$, 231 ppm $MgSO_4.7H_2O$, 231 ppm $NaHCO_3$) and the treatment chemicals were combined in a jacketed mixer (Eberbach Corp., Ann Arbor, Mich.) and allowed to equilibrate to a temperature of 125° F. A sample (100±1 mg) of crushed Amoco (Whiting, Ind.) Eskar Wax R-35, petroleum wax with a melting point of approximately 131° F. was then added and the mixer was run on high for 6 minutes. The generated fiber-wax slurry was then filtered through a 9.0 cm Reeve Angel grade 230 paper filter (Whatman, Fairfield, N.J.), and the turbidity of filtrate was measured using a Hach Model 2100A Turbidimeter (Hach Company, Loveland, Colo.). Measured turbidity values for various chemical-to-wax ratios from the testing of several products are shown in Table 1. Background corrections were made for turbidity contributions from the chemistry alone. Higher turbidity levels correspond to higher levels of dispersion. Table 1 also shows results for the combination dispersants. The data indicates that the combination of naphthalene sulfonate and an EO/PO copolymer provided better performance than the individual chemistries (in efficiency and effectiveness in dispersing the added wax), and that the introduction of 2,2,4-trimethyl-1,3-pentanediol diisobutyrate to this combination produced the best performance of the chemistries tested.

TABLE 1

Results of Wax Dispersion Tests

| Chemistry | 0 g/g | 0.25 g/g | 0.50 g/g | 1.00 g/g | 2.00 g/g | 3.00 g/g | 4.00 g/g |
|---|---|---|---|---|---|---|---|
| 9–10 mole % EO Ethoxylated Nonyl Phenol[1] | 43.0 | 165 | 200 | 230 | | | 275 |
| Na Naphthalene Sulfonate[2], MW~12,000, 40% Solids[2] | 45.0 | 210 | 235 | 260 | 300 | | 350 |
| Ammonia Lignosulfonate, Polyethylene Glycol[3], 50% Solids | 45.0 | 175 | 160 | 160 | | 160 | |
| Na Dioctyl Sulfosuccinate[4], 52.5% Solids | 45.0 | 200 | 260 | 290 | | 300 | |

TABLE 1-continued

Results of Wax Dispersion Tests

| | | | | | | |
|---|---|---|---|---|---|---|
| 2,2,4-Trimethyl-1,3-Pentanediol Diisobutyrate[5] | 50.0 | 140 | 132 | 170 | 170 | |
| 10 mole % EO EO/PO Copolymer[6], MW~3600 | 30.0 | 260 | 410 | 420 | 375 | 390 |
| Conventional Dispersant 1[7] (49% Solids) | 60.0 | 190 | 180 | 200 | 230 | 230 |
| Conventional Dispersant 2[8] (20% Solids) | 45.0 | 95.0 | 110 | 140 | | 175 |

| Chemistry (Blends) | 0 g/g | 0.20 g/g | 0.75 g/g | 1.20 g/g |
|---|---|---|---|---|
| Naphthalene Sulfonate[2] (40% solids) and EO/PO Copolymer[6] (equal mass blend) | 45.0 | 510 | 465 | 420 |
| Naphthalene Sulfonate[2] (40% solids), EO/PO Copolymer[6], and 2,2,4-Trimethyl-1,3-Pentanediol Diisobutyrate[5] (equal mass blend) | 45.0 | 490 | 525 | 650 |

[1]available from Nalco Chemical Co. of Naperville, IL
[2]available from Hampshire Chemical Corporation of Lexington, Massachusetts under the trade name DAXAD 16
[3]available from Nalco Chemical Co. of Naperville, IL
[4]available from Nalco Chemical Co. of Naperville, IL
[5]available from Nalco Chemical Co. of Naperville, IL
[6]available from Nalco Chemical Co. of Naperville, IL
[7]available from Nalco Chemical Co. of Naperville, IL
[8]available from Nalco Chemical Co. of Naperville, IL

EXAMPLE 2

The following method was also utilized to determine effectiveness of the wax dispersant treatments. Two-hundred-fifty mL of hardened distilled water (275.4 ppm $CaCl_2.2H_2O$, 231 ppm $MgSO_4.7H_2O$, 231 ppm $NaHCO_3$) and the treatment chemical were combined in a jacketed mixer (Eberbach Corp., Ann Arbor, Mich.) and allowed to equilibrate to a temperature of 125° F. A sample of corrugated container board coated with petroleum wax was then added and the mixer was run for 6 minutes. Coated board samples were produced by dipping ~1"×1" sections of board into a melted wax mixture (heated to 200° F.) containing 20% impregnating wax and 80% saturating wax from various sources (Amoco, Whiting, Ind., Chevron, San Francisco, Calif., Conoco, Lake Charles, La., Exxon, Batton Rouge, La., Mobil, Fairfax, Va.) ranging in melting point from 127–150° F. The coating level for these sections was approximately 300–400 mg per 400 mg corrugated board. The fiber-wax slurry generated in the mixture was then filtered through a 9.0 cm Reeve Angel grade 230 paper filter (Whatman, Fairfield, N.J.), and a portion of the filtrate (100 mL) was combined with 100 mL of propanol and mixed for 10 minutes and passed through a preweighed 0.45 μm filter membrane (Gelman Sciences, Ann Arbor, Mich.). The sample was then dried overnight and weighed. FTIR analysis indicated that the collected sample was composed primarily of the wax introduced to the sample. Table 3 reports the percentage of wax added that is dispersed by the chemical as a function of the treatment concentration reported in g treatment per g wax. Results have an estimated uncertainty of ±7%. Dispersant A is a conventional wax treatment that has a solids level of approximately 20%. The active component is an alkoxylated alkanol amide. Dispersant B is a combination of an EO/PO block copolymer and naphthalene sulfonate (40% solids) with a solids level of 43%. Dispersant C is an equal mass combination of the EO/PO block copolymer, naphthalene sulfonate (40% solids) and 2,2,4-trimethyl-1,3-pentanediol diisobutyrate with a solids level of 43%. The level of wax dispersion is reported as $$\text{wax dispersion}(\%) = \frac{2.5 \times \text{mass of wax collected on } 0.45 \mu m \text{ filter membrane}}{\text{mass of wax added}} \times 100$$

The data indicates that Dispersant B greatly outperforms the conventional wax treatment Dispersant A. The performance of Dispersant B is then further increased (significantly) with the addition of 2,2,4-trimethyl-1,3-pentanediol diisobutyrate (Dispersant C).

TABLE 2

Wax dispersion test results

| Conc. Dispersant A[1] (g/g) | wax dispersion (%) | Conc. Dispersant B[2] (g/g) | wax dispersion (%) | Conc. Dispersant C[3] (g/g) | wax dispersion (%) |
|---|---|---|---|---|---|
| 0 | 9.7 | 0 | 11 | 0 | 11 |
| 0.68 | 6.6 | 0.53 | 31 | 0.60 | 51 |
| 1.3 | 7.8 | 1.2 | 44 | 1.2 | 76 |
| 2.3 | 6.5 | 1.6 | 45 | 2.5 | 79 |
| 4.9 | 8.5 | 4.6 | 55 | 4.0 | 84 |
| 8.4 | 9.4 | 6.2 | 59 | 8.4 | 97 |
| 9.8 | 9.4 | 8.8 | 62 | 10 | 97 |

[1]available from Nalco Chemical Co. of Naperville, IL
[2]available from Nalco Chemical Co. of Naperville, IL
[3]available from Nalco Chemical Co. of Naperville, IL

EXAMPLE 3

The same procedure as described in Example 2 was used with the exception of the temperature. Table 3 shows results at 115, 135 and 145° F. The results indicate that increasing temperature increases the performance of the dispersants and that the addition of 2,2,4-trimethyl-1,3-pentanediol diisobutyrate to an already effective dispersant (Dispersant B) produces a formulation (Dispersant C) that provides greater dispersion of the wax both below and above its melting point.

TABLE 3

Wax dispersion test results at various temperatures

| Conc. Dispersant A[1] (g/g) | wax dispersion (%) | Conc. Dispersant B[2] (g/g) | wax dispersion (%) | Conc. Dispersant C[3] (g/g) | wax dispersion (%) |
|---|---|---|---|---|---|
| 115° F. | | | | | |
| 0 | 1.1 | 0 | 3.0 | 0 | 2.9 |
| 0.68 | 1.3 | 0.64 | 8.8 | 0.80 | 25 |
| 1.4 | 1.5 | 1.4 | 11 | 1.4 | 28 |
| 2.6 | 0.3 | 2.5 | 13 | 2.6 | 37 |
| 5.9 | 1.8 | 6.8 | 17 | 6.3 | 40 |
| 8.1 | 2.1 | 10 | 22 | 8.4 | 40 |
| 11 | 1.9 | 12 | 19 | 12 | 45 |
| 135° F. | | | | | |
| 0 | 9 | 0 | 11 | 0 | 11 |
| 0.48 | 21 | 0.47 | 43 | 0.72 | 78 |
| 1.1 | 20 | 1.3 | 69 | 1.1 | 90 |
| 2.8 | 20 | 1.8 | 70 | 2.2 | 95 |
| 3.8 | 19 | 3.7 | 76 | 4.6 | 100 |
| 7.5 | 22 | 6.4 | 79 | 8.9 | 100 |
| 8.6 | 21 | 7.9 | 76 | 7.5 | 100 |
| 145° F. | | | | | |
| 0 | 17 | 0 | 18 | 0 | 17 |
| 0.62 | 28 | 0.49 | 67 | 0.78 | 87 |
| 1.1 | 27 | 1.2 | 70 | 1.3 | 100 |
| 3.0 | 33 | 2.5 | 92 | 2.8 | 100 |
| 4.6 | 35 | 4.6 | 95 | 5.7 | 100 |
| 7.4 | 36 | 8.4 | 100 | 8.0 | 100 |
| 12 | 39 | 12 | 93 | 11 | 100 |

[1]available from Nalco Chemical Co. of Naperville, IL
[2]available from Nalco Chemical Co. of Naperville, IL
[3]available from Nalco Chemical Co. of Naperville, IL

EXAMPLE 4

Another method to determine dispersion effectiveness is the coupon deposition test, described herein. A cleaned Teflon™ coupon was preweighed and fixed in the top of a jacketed mixer (Eberbach Corp., Ann Arbor, Mich.). Two-hundred-fifty milliliters of hardened distilled water (275.4 ppm $CaCl_2.2H_2O$, 231 ppm $MgSO_4.7H_2O$, 231 ppm $NaHCO_3$) and the treatment chemical were then added and allowed to equilibrate to 125° F. A piece of bleached kraft paper coated with approximately 100 mg of wax was then added, and the mixer was run for 6 minutes. The coupon was then removed and rinsed with distilled water to remove any non-deposited wax, and hung up to dry. The dried weight of wax deposited on Teflon™ coupon was report as $$\% \text{ deposited} = \frac{\text{wt. wax deposited}}{\text{wt. wax added}} \times 100$$

Tables 4 and 5 report the results of wax deposition tests at various temperatures on three commercially waxes used to coat corrugated containers. The Amoco (Whiting, Ind.) Eskar R-35 and Chevron (San Francisco, Calif.) Saturating Wax 2 contain paraffin wax with little or no additives. The Conoco (Lake Charles, La.) Supercote™ ⅘ is a curtain coating wax containing significant levels of a polymer additive. Table 4 lists results for testing when no dispersant was added and Table 5 presents values for when Dispersant C was added at levels of 1 g treatment per 1 g wax.

The tables also show the results of dispersion tests. In that procedure 250 mL of hardened distilled water (275.4 ppm $CaCl_2.2H_2O$, 231 ppm $MgSO_4.7H_2O$, 231 ppm $NaHCO_3$) and the treatment chemical were combined in a jacketed mixer (Eberbach Corp., Ann Arbor, Mich.) and allowed to equilibrate to a selected temperature. A 200 mg sample of wax was then added and the mixer was run for 6 minutes. The fiber-wax slurry generated in the mixture was then filtered through a 9.0 cm Reeve Angel grade 230 paper filter (Whatman, Fairfield, N.J.), and a portion of the filtrate was used to make a turbidity measurement. Another portion (100 mL) was combined with 100 mL of propanol and mixed for 10 minutes and passed through a preweighed 0.45 $\mu m$ filter membrane (Gelman Sciences, Ann Arbor, Mich.). The sample was then dried overnight and weighed. The level of wax dispersion is reported as $$\text{wax dispersion (\%)} = \frac{2.5 \times \text{mass of wax collected on 0.45 } \mu m \text{ filter membrane}}{\text{mass of wax added}} \times 100$$

Again, Table 4 describes performance when no dispersant was present and Table 5 lists dispersion results with 200 mg of Dispersant C present. The results indicate that for the materials composed primarily of paraffin waxes at a given temperature, Dispersant C is able to significantly improve dispersion (breaking the material down and preventing deposition). For materials containing higher levels of additives, Dispersant C again enhances dispersion. However, its greater contribution for this material is to prevent deposition.

TABLE 4

Dispersion and deposition test results when no treatment chemical is present

| | Chevron Saturating Wax #2 | | | Amoco R-35 Impregnating Wax | | | Conoco 752 Curtain Coating | | |
|---|---|---|---|---|---|---|---|---|---|
| Temp | % deposition | % dispersion | Turbidity | % deposition | % dispersion | Turbidity | % deposition | % dispersion | Turbidity |
| 80 | 9.3 | 1.0 | 1.0 | 28 | 1.1 | 1.5 | 9.0 | 2.5 | 0.75 |
| 90 | 14 | 1.4 | 1.0 | 35 | 1.6 | 1.0 | 8.9 | 1.6 | 1.0 |
| 100 | 12 | 2.0 | 1.0 | 41 | 4.6 | 1.0 | 13 | 2.2 | 1.0 |
| 110 | 14 | 2.4 | 1.8 | 42 | 6.1 | 2.6 | 17 | 2.1 | 1.8 |
| 120 | 12 | 2.4 | 8.0 | 50 | 0.37 | 44 | 12 | 1.0 | 1.4 |
| 130 | 28 | 24 | 140 | 11 | 8.6 | 63 | 14 | 1.4 | 4.4 |
| 140 | 6.4 | 51 | 250 | 2.2 | 56 | 350 | 15 | 4.2 | 25 |
| 150 | 3.5 | 73 | 320 | 0.46 | 57 | 200 | 7.7 | 21 | 82 |
| 160 | 3.6 | 69 | 300 | 1.4 | 75 | 200 | 5.7 | 19 | 64 |

TABLE 5

Dispersion and deposition test results in the presence of Dispersant C at a level of 1 mg/mg wax

| | Chevron Saturating Wax #2 | | | Amoco R-35 Impregnating Wax | | | Conoco 752 Curtain Coating | | |
|---|---|---|---|---|---|---|---|---|---|
| Temp | % deposition | % dispersion | Turbidity | % deposition | % dispersion | Turbidity | % deposition | % dispersion | Turbidity |
| 80  | 3.4  | 2.1 | 9.7  | 3.3  | 1.4 | 8.5  | 2.2  | 1.0 | 10   |
| 90  | 2.6  | 1.4 | 10   | 8.1  | 1.1 | 12   | 2.5  | 1.5 | 10   |
| 100 | 5.4  | 2.2 | 9.8  | 17   | 2.1 | 9.5  | 2.2  | 3.4 | 9.5  |
| 110 | 6.5  | 4.0 | 10   | 21   | 10  | 14   | 4.5  | 2.9 | 8.0  |
| 120 | 6.5  | 22  | 58   | 30   | 46  | 340  | 8.2  | 2.2 | 10   |
| 130 | 10   | 74  | 1400 | 9.4  | 81  | 2000 | 7.7  | 10  | 46   |
| 140 | 1.0  | 83  | 2100 | 0.24 | 92  | 2400 | 5.5  | 26  | 340  |
| 150 | 0.69 | 97  | 1900 | 0.0  | —   | 2200 | 0.72 | 55  | 625  |
| 160 | 0.0  | 95  | 2000 | 0.0  | 100 | 2000 | 0.65 | 53  | 550  |

EXAMPLE 5

The stability of the wax treated with this treatment was tested in the following manner. Five-hundred mL of hardened distilled water (275.4 ppm $CaCl_2.2H_2O$, 231 ppm $MgSO_4.7H_2O$, 231 ppm $NaHCO_3$) and treatment chemical (when treatment was tested) were combined in a 2, 250 mL, jacketed mixers (Eberbach Corp., Ann Arbor, Mich.) and allowed to equilibrate to a temperature of 145° F. A 150 mg sample of Chevron (San Francisco, Calif.) Saturating Wax 2 were then added to each mixer and the mixer was run for 6 minutes. The wax dispersions generated were then combined with 2500 mL of 100° F. hardened distilled water (275.4 ppm $CaCl_2.2H_2O$, 231 ppm $MgSO_4.7H_2O$, 231 ppm $NaHCO_3$) in a 3000 mL beaker and mixed for about 2 minutes. A 300 mL sample was drawn and analyzed by filtering it through a 9.0 cm Reeve Angel grade 230 paper filter (Whatman, Fairfield, N.J.), combining it with 200 mL of isopropanol, mixing the sample for 10 minutes, and passing it through a preweighed 0.45 μm filter membrane (Gelman Sciences, Ann Arbor, Mich.). The sample was then dried overnight and weighed. A portion of the remaining, untested sample, was then transferred to a 2000 mL Erlenmeyer flask, placed in a 100° F. temperature bath, covered, and mixed at 500 rpm using a Britt Jar propeller (Paper Research Materials, Gig Harbor, Wash.). Samples were then drawn and analyzed on a periodic basis. Table 6 describes stability when no dispersant was present, and when Dispersant B and Dispersant C were present at levels of 2 g/g wax. The results indicate that the dispersion produced with Dispersant C is significantly more stable than those produced with Dispersant B and with no dispersant present.

TABLE 6

Dispersion stability at 100° F.

| No Dispersant | | Dispersant B | | Dispersant C | |
|---|---|---|---|---|---|
| Time (hrs.) | Dispersion (%) | Time (hrs.) | Dispersion (%) | Time (hrs.) | Dispersion (%) |
| 0    | 100 | 0  | 100 | 0  | 100 |
| 0.04 | 48  | 1  | 85  | 1  | 96  |
| 0.23 | 31  | 2  | 87  | 2  | 102 |
| 0.33 | 22  | 4  | 85  | 4  | 109 |
| 0.42 | 21  | 8  | 85  | 8  | 108 |
| 0.5  | 18  | 24 | 48  | 24 | 103 |
| 1    | 13  | —  | —   | —  | —   |
| 2.2  | 7.3 | —  | —   | —  | —   |

EXAMPLE 6

The treatments were also tested in the following manner. Two liters of hardened distilled water (275.4 ppm $CaCl_2.2H_2O$, 231 ppm $MgSO_4.7H_2O$, 231 ppm $NaHCO_3$) were preheated to 135° F. and added to a temperature controlled British disintegrator. One gram of a blend of an EO/PO copolymer, naphthalene sulfonate, and 2,2,4-trimethyl-1,3-pentanediol diisobutyrate were added (enough to disperse nearly 100% of the added wax) and mixed for 30 seconds. A single coated board sample and 24 g of sectioned corrugated board (~1"×1") were then added and the British disintegrator was run for 25 minutes (~77,500 revolutions). Coated board samples were produced by dipping ~1"×1" sections of board into a melted wax mixture (heated to 200° F.) containing 20% impregnating wax and 80% saturating wax from various sources (Amoco, Whiting, Ind., Chevron, San Francisco, Calif., Conoco, Lake Charles, La., Exxon, Batton Rouge, La., Mobil, Fairfax, Va.) ranging in melting point from 127–150° F. The coating level for these sections was approximately 300–400 mg per 400 mg corrugated board. The sample was maintained at 135° F. and 250 mL aliquots were transferred into 400 mL plastic tri-pour beakers for testing. Using a Britt Jar propeller (Paper Research Materials, Gig Harbor, Wash.) with a mixing speed of 500 rpm, the coagulant treatment was mixed into the stock sample using a syringe according to the following mixing sequence:

| Time (seconds) | Procedure |
|---|---|
| 0  | start mixer |
| 10 | add coagulant polymer |
| 30 | stop mixer |

Immediately following this sequence the sample was filtered through Reeve Angel 230 paper filter (Whatman, Fairfield, N.J.), and the turbidity of the filtrate was measured. Results are reported as a turbidity reduction calculated as $$\text{Turbidity Reduction} = \frac{(\text{Turbidity})_{Blank} - (\text{Turbidity})_{Sample}}{(\text{Turbidity})_{Blank}}.$$

The dose (g polymer actives per g wax) necessary to achieve turbidity reduction values of >0.80 for various coagulants is shown in Table 7. All treatments are conventional coagulant treatments for contaminants. This data indicates that once a material has been dispersed it can be removed (for example) through the addition of a coagulant.

TABLE 7

Wax Coagulant Test results.

| Chemistry | dose (g/g) necessary to achieve >0.8 turbidity reduction |
|---|---|
| Linear Epichlorohydrin-Dimethylamine Copolymer[1] | 0.137 |
| EDC/Ammonia Polymer[2] | 0.497 |
| Ammonia Crosslinked Epichlorohydrin-Dimethylamine Copolymer[3] | 0.310 |
| Polyacrylamide[4] | 1.33 |
| Poly Diallyl Dimethylammonium Chloride 1[5] | 0.193 |
| Poly Diallyl Dimethylammonium Chloride 2[6] | 0.161 |
| Poly Diallyl Dimethylammonium Chloride 3[7] | 0.236 |
| Poly Diallyl Dimethylammonium Chloride 4[8] | 0.187 |

[1]available from Nalco Chemical Co. of Naperville, IL
[2]available from Nalco Chemical Co. of Naperville, IL
[3]available from Nalco Chemical Co. of Naperville, IL
[4]available from Nalco Chemical Co. of Naperville, IL
[5]available from Nalco Chemical Co. of Naperville, IL
[6]available from Nalco Chemical Co. of Naperville, IL
[7]available from Nalco Chemical Co. of Naperville, IL
[8]available from Nalco Chemical Co. of Naperville, IL

What is claimed is:

1. A method of treating contaminants in a contaminated fiber slurry containing wax during recycling comprising the steps of:

a) adding to a contaminated fiber slurry containing wax at least one plasticizer, wherein said plasticizer is selected from the group consisting of adipic acid, dimethyl adipate, diethyl adipate, di-n-butyl adipate, diisobutyl adipate, di-n-hexyl adipate, di (1,3-dimethylbutyl) adipate, di-2-ethylhexyl adipate, diisooctyl adipate, dicapryl adipate, heptyl nonyl adipate, diisononyl adipate, di-n-octyl-n-decyl adipate, diisodecyl adipate, dicyclohexyl adipate, benzyl octyl adipate, dibutoxyethyl adipate, bis (2,2,4-trimethyl-1,3-pentanediol monoisobutyl) adipate, bis(4-chlorobutyl) adipate, diisohexyl adipate, azelates, benzoates, benzotriazoles, brassylates, citrates, glutarates, hexahydrophthalates, isophthalates, isosebacates, oleates, palmitates, pentaerythritol esters, phthalates, pyromellitates, ricinoleates, salicylates, sebacates, stearates, succinates, tartrates, terephthalates, tetrahydrophthalates, and trimellitates;

b) dispersing contaminants from said contaminated fiber slurry containing wax to obtain a treated fiber in a contaminant-containing slurry containing wax;

c) separating said treated fiber from said contaminant-containing slurry containing wax; and, d) recovering said treated fiber.

2. The method of claim 1 further comprising in step a) adding at least one hydrophobic surface active polymeric wetting agent and at least one dispersant, wherein said hydrophobic surface active polymeric wetting agent is an ethylene oxide/propylene oxide block copolymer and said dispersant is selected from the group consisting of naphthalene sulfonic acid-formaldehyde condensates and lignin sulfonates.

3. The method of claim 1 wherein said contaminated fiber slurry comprises old corrugated containers.

4. The method of claim 1 further comprising between step b) and step c) the addition of a compound selected from the group consisting of: coagulants, bentonite and colloidal silica; wherein said coagulants are selected from the group consisting of alum, polyaluminum chloride, poly (amine/epichlorohydrin) condensation polymers, polyethylene imines, poly(aminoamide/epichlorohydrin) condensation polymers, poly(diallyldimethylammonium chloride) and glyoxylated acrylamide/diallyldimethyl ammonium chloride copolymers.

\* \* \* \* \*